United States Patent Office 3,379,509
Patented Apr. 23, 1968

3,379,509
IMINO BIS (SULFURYL HALIDE) PRODUCT AND PROCESS FOR PREPARING THE SAME
Rolf Appel, Heidelberg, Germany, assignor to Olin Mathieson Chemical Corporation, a corporation of Virginia
No Drawing. Filed Nov. 6, 1962, Ser. No. 235,829
Claims priority, application Germany, Dec. 9, 1961, A 38,991, A 38,992
5 Claims. (Cl. 23—357)

This invention relates to a novel composition of matter and method for preparing same. The novel composition has the formula $HN(SO_2X)_2$ wherein X is chlorine or fluorine. The compositions of the invention are prepared by the action of the halosulfonic acid on the halosulfonyl isocyanate of the formula $XSO_2NCO$. The latter reagent can be preformed or it can be formed in situ by the action of the halosulfonic acid on urea.

The imino bis(sulfuryl halides), $NH(SO_2X)_2$, are not described in the literature (prior to the date of my German patent applications).

Imino bis(sulfuryl fluoride) is with particular advantage formed by the reaction of fluorosulfonic acid with urea. The reaction proceeds with the splitting out of hydrogen fluoride and carbon dioxide according to the equation:

$$NH_2-CO-NH_2 + 3FSO_3H \rightarrow HN(SO_2F)_2 + NH_4HSO_4 + HF + CO_2$$

One works best without solvent. The product is worked up by fractional distillation. Imino bis(sulfuryl fluoride) boils at 170° C. at 760 mm. and melts at 17° C.

Imino bis(sulfuryl chloride) is with particular advantage formed by the reaction of chlorosulfonic acid with chlorosulfonyl isocyanate. The latter may be prepared, for example, as described by R. Graf, Chem. Ber. 89, 1071 (1956) from cyanogen chloride and sulfur trioxide or by the action of chlorosulfonic acid on urea in a molar ratio of about 2:1. The latter reaction proceeds according to the equation:

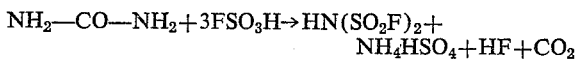

The reaction of chlorosulfonyl isocyanate with additional chlorosulfonic acid proceeds by decarboxylation and liberation of $CO_2$ at the boiling point of the chlorosulfonyl isocyanate:

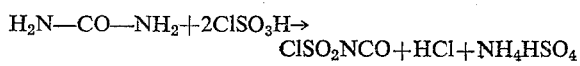

One works best without solvent. The yields are very good.

In carrying out the above reactions, the use of substantially stoichiometric amounts of reactants is preferred but deviations of up to 10 percent therefrom are suitable.

Imino bis(sulfuryl chloride) prepared in this way is very pure and useful for further reaction. For the preparation of the analytically pure substance, it is distilled in vacuum. It boils at 115° at about 4 mm. and melts at 37° C.

The imino bis(sulfuryl halides) are useful as intermediates in the preparation of organic and inorganic compounds, for example, for pesticides, wood preservatives and pharmaceuticals. Water hydrolyzes these halides to sulfamic acid but caustic potash leads to the potassium iminosulfate, $HN(SO_2OK)_2$. Potassium amide in liquid ammonia forms the N—K amide, $KN(SO_2NH_2)_2$ identified as the silver salt, $KN(SO_2NAg)_2$ found to contain 49.8 percent silver. Iminosulfamide was formed by digesting this silver salt with hydrochloric acid and replacing the potassium by hydrogen using an acidic ion exchange resin.

Example I (A) *Preparation of chlorosulfonyl isocyanate.*—To 69 grams (1.15 moles) of urea is added dropwise, with cooling and shaking, 267 grams (2.29 moles) of chlorosulfonic acid. The reaction mixture was vacuum distilled and the volatile materials condensed in a cold trap. The condensate was redistilled separating the $ClSO_2NCO$ which boiled at 106–107° C., at 760 mm.

Analysis for $CClNO_3S$.—Calc.: C, 48; N, 9.89; S, 22.65; Cl, 25.06. Found: C, 8.55; N, 10.05; S, 22.88; Cl, 25.81.

(B) *Preparation of imino bis(sulfuryl chloride).*—A mixture of 166 grams (1.42 moles) of chlorosulfonic acid and 202 grams (1.42 moles) of chlorosulfonyl isocyanate was heated in a one liter flask fitted with reflux condenser and drying tube and placed in an oil bath. The mixture begins to boil at 110° C. with slow evolution of carbon dioxide. The reflux temperature gradually rises. The reaction is complete when carbon dioxide evolution ceases. The crude product is quite pure imino bis(sulfuryl chloride) and can be used for many purposes without purification. It crystallizes when cooled in ice-water. Yield, 275 grams (1.28 moles) or about 91 percent of theory.

To purify, the product is vacuum distilled. It boils at 115° C. at about 4 mm. and crystallizes in the receiver. Melting point, 38–39° C. Yield 226 grams (1.06 moles) or about 75 percent of theory.

Example II

To 60 grams (1 mole) of urea in a one-liter flask was added dropwise 300 grams (3 moles) of fluorosulfonic acid. From time to time the flask was cooled. Finally the now mostly liquid reaction mixture was distilled at about 1 mm. The distillation was continued until no more liquid distilled over and a dry residue of salt remained in the flask. The distillate, containing unreacted fluorosulfonic acid, was carefully fractioned. Imino bis(sulfuryl fluoride) boils at 170° C. at 760 mm., melts at 17° C. and has a $d_4^{20}=1.892$. Yield 85 grams (0.47 mole) or about 60 percent of theory based on fluorosulfonic acid reacted.

Analysis for $HNO_4S_2F_2$.—Calc.: H, 0.56; N, 7.7; S, 35.2; F, 21.1. Found: H, 0.7; N, 7.6; S, 35.2; F, 20.9.

The molecular weight, determined cryoscopically in benzene, was 182 compared with 181.1 calculated.

Example III

To 60 grams (1 mole) of urea was added dropwise 348 grams (3 moles) of chlorosulfonic acid. A chlorine-green colored solution resulted from which after a short time a colorless solid separated. The mixture, without removing the solid was distilled at 1 to 2 mm. The distillate was fractionated and refractionated to obtain imino bis(sulfuryl chloride) boiling at 115° C. at 4 mm. Melting point, 37° C.

Analysis for $HNO_4S_2Cl_2$.—Calc.: H, 0.47; N, 6.54; S, 29.95; Cl, 33.12. Found: H, 0.85; N, 6.34; S, 29.7; Cl, 33.1.

The molecular weight, determined cryoscopically in benzene, was 210 compared with 214 calculated.

What is claimed is:

1. A composition of matter having the formula $HN(SO_2X)_2$ wherein X is selected from the group consisting of chlorine and fluorine.

2. The method of preparing a compound having the formula $HN(SO_2X)_2$ wherein X is selected from the group consisting of chlorine and fluorine which comprises maintaining a mixture of a halosulfonyl isocyanate and a halosulfonic acid at a temperature between room temperature and reflux temperature, the halogen in said halosulfonyl isocyanate and in said halosulfonic acid being selected from the group consisting of chlorine and fluorine.

3. The method of claim 2 in which the halosulfonyl isocyanate is formed in situ by heating urea and a halosulfonic acid, the halogen in said halosulfonyl isocyanate and in said halosulfonic acid being selected from the group consisting of chlorine and fluorine.

4. The method of claim 2 in which the molar ratio of said halosulfonyl isocyanate to said halosulfonic acid is within 10% of 1:1.

5. The method of claim 3 in which the molar ratio of said urea to said halosulfonic acid is within 10% of 1:3.

References Cited

FOREIGN PATENTS 947,554   7/1956   Germany.

OTHER REFERENCES

Appel et al.: "Angwandte Chemie," vol. 70, p. 742 (1958).

Appel et al.: "Angewandte Chemie," vol. 70, p. 504 (1958).

Appel et al.: "Angewandte Chemie," vol. 70, p. 572 (1958).

Appel et al.: "Berichte," vol. 95, pp. 246–248 (January 1962).

Appel et al.: "Berichte," vol. 95, pp. 625–626 (March 1962).

MILTON WEISSMAN, *Primary Examiner.*